(12) United States Patent
Ruiz Rincón

(10) Patent No.: US 8,919,855 B2
(45) Date of Patent: Dec. 30, 2014

(54) METAL-PLASTIC HYBRID SUPPORT STRUCTURE APPLICABLE TO A DASHBOARD SUPPORT OF A VEHICLE

(75) Inventor: Rafael Ruiz Rincón, Martorell Barcelona (ES)

(73) Assignee: Barcelona Technical Center, S.L. (ES)

( * ) Notice: Subject to any disclaimer, the term of this patent is extended or adjusted under 35 U.S.C. 154(b) by 192 days.

(21) Appl. No.: 13/257,294

(22) PCT Filed: Mar. 22, 2010

(86) PCT No.: PCT/IB2010/000678
§ 371 (c)(1),
(2), (4) Date: Oct. 4, 2011

(87) PCT Pub. No.: WO2010/109314
PCT Pub. Date: Sep. 30, 2010

(65) Prior Publication Data
US 2012/0032044 A1   Feb. 9, 2012

(30) Foreign Application Priority Data

Mar. 25, 2009  (EP) .................................... 09380060

(51) Int. Cl.
*B62D 25/14* (2006.01)
*B62D 29/00* (2006.01)

(52) U.S. Cl.
CPC ............ *B62D 25/145* (2013.01); *B62D 29/001* (2013.01); *B62D 29/004* (2013.01)
USPC ....................................... 296/70; 296/193.02

(58) Field of Classification Search
CPC .... B62D 25/081; B62D 25/14; B62D 25/142; B62D 25/145; B62D 29/001; B62D 29/004; B32B 15/08; B32B 3/06
USPC ................. 296/70, 72, 193.02; 293/121, 122; 249/59, 63, 64
See application file for complete search history.

(56) References Cited

U.S. PATENT DOCUMENTS

| 5,676,216 A | 10/1997 | Palma et al. |
| 6,547,210 B1 * | 4/2003 | Marx et al. .................... 249/175 |
| 7,216,927 B2 * | 5/2007 | Luo et al. ................. 296/193.02 |
| 2002/0160145 A1 * | 10/2002 | Bauhoff .......................... 428/99 |

(Continued)

FOREIGN PATENT DOCUMENTS

| DE | 10360045 A1 | 7/2005 |
| EP | 1842714 A1 | 10/2007 |

(Continued)

OTHER PUBLICATIONS

Plenco, Plastics Engineering Co., Basic Thermoset Part Design Suggestions, published Jan. 29, 2009, available at http://www.plenco.com/plenco_processing_guide/Sect%203%20Thermoset%20Part%20Design%20Tips.pdf.*

(Continued)

*Primary Examiner* — Glenn Dayoan
*Assistant Examiner* — Jason S Daniels
(74) *Attorney, Agent, or Firm* — Hess Patent Law Firm LLC; Robert J. Hess

(57) ABSTRACT

The invention relates to a metal-plastic hybrid support structure applicable to a dashboard support of a vehicle, wherein the hybrid support structure comprises a metal tubular body (10) having a closed cross section profile and suitable length to be assembled between two elements of a frame of an automotive vehicle, a plurality of projecting metal fastening elements (14) distributed along said metal tubular body (10) and fixed thereto, and a plastic body defining a plurality of plastic functional elements (11, 12) overmolded on different separate regions of the metal tubular body (10), each plastic functional element (11, 12) embedding at least one of the projecting metal fastening elements (14). In one embodiment, the projecting metal fastening elements (14) are stems with outer screw threading.

24 Claims, 8 Drawing Sheets

(56) References Cited

U.S. PATENT DOCUMENTS

2003/0122404 A1* 7/2003 Duchez .................. 296/208
2009/0039668 A1* 2/2009 Baudart ................... 296/72

FOREIGN PATENT DOCUMENTS

| JP | 62118961 A | * | 5/1987 |
| WO | 02068257 A1 | | 9/2002 |
| WO | 2010/109314 A1 | | 9/2010 |

OTHER PUBLICATIONS

CustomPartNet.com, material relied upon copyright 2007, retreived from www.custompartnet.com/wu/InjectionMolding on Sep. 25, 2013.*

* cited by examiner

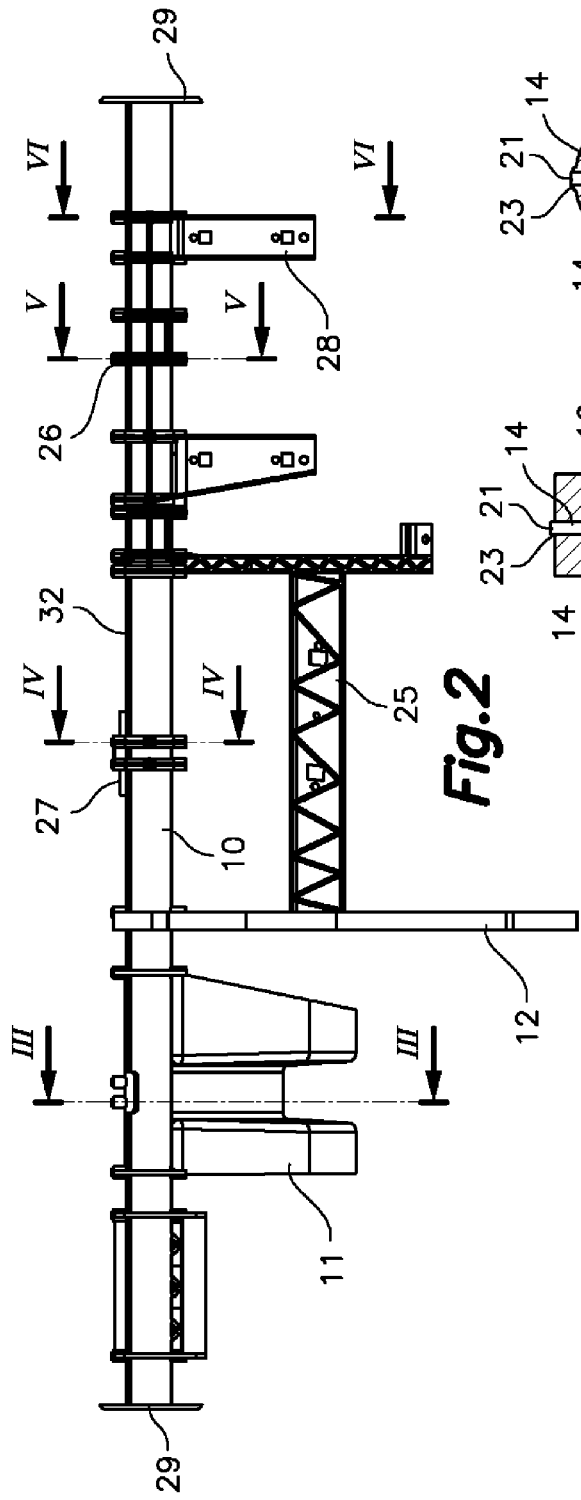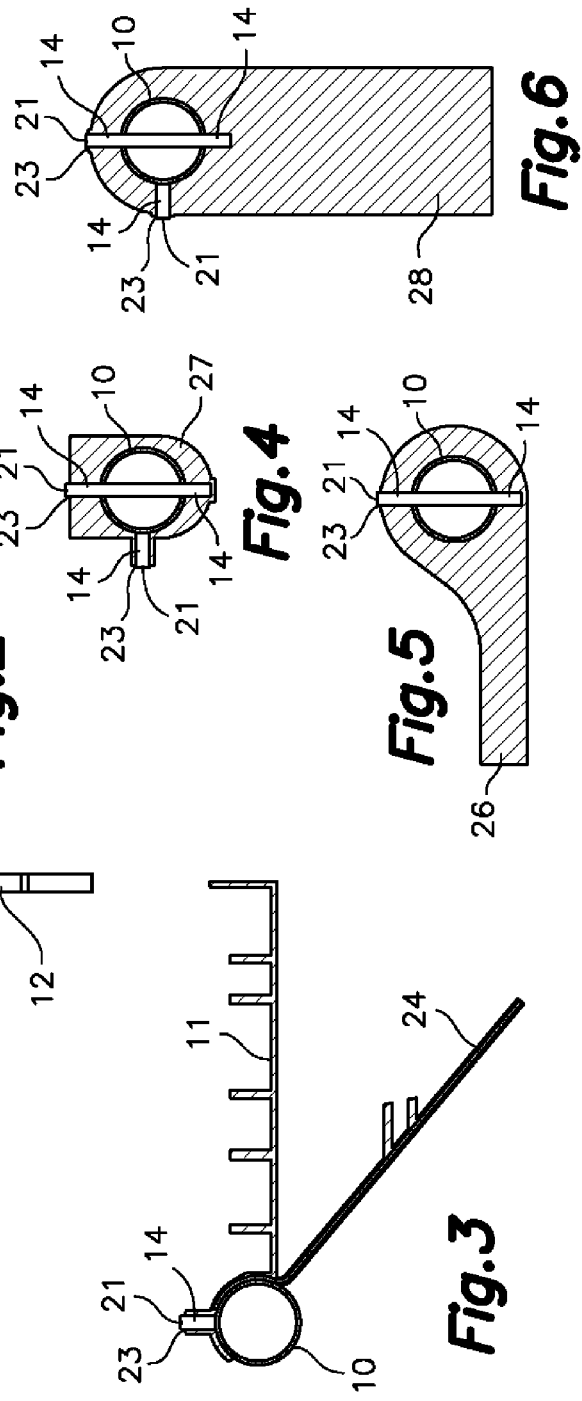

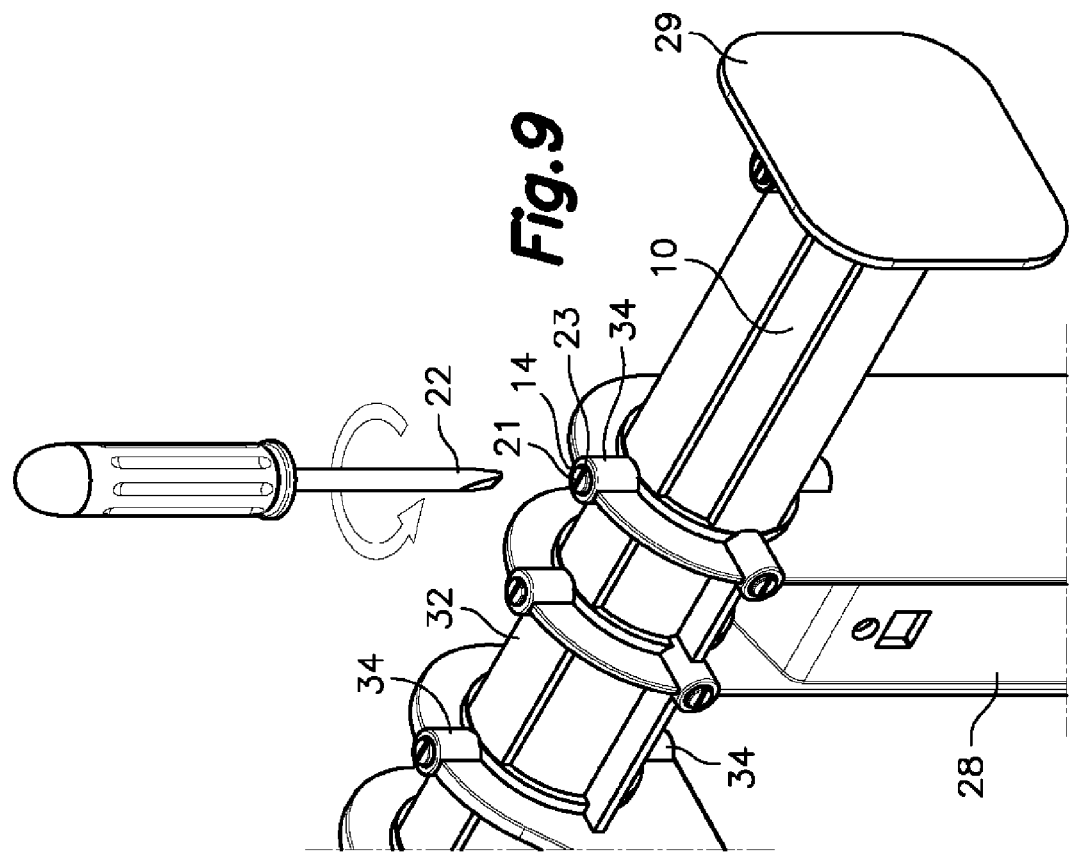
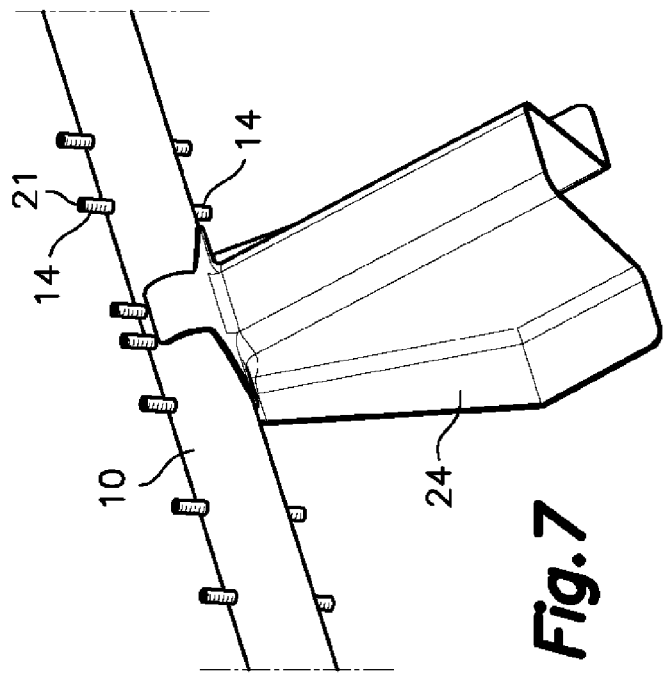
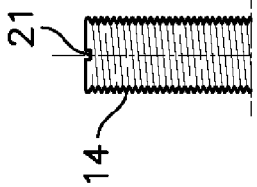
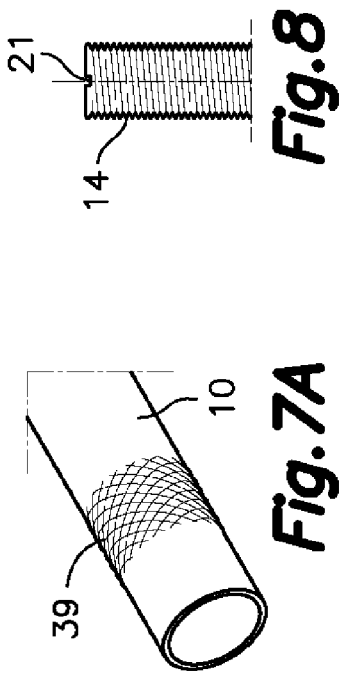

METAL-PLASTIC HYBRID SUPPORT STRUCTURE APPLICABLE TO A DASHBOARD SUPPORT OF A VEHICLE

TECHNICAL FIELD

The present invention relates to a metal-plastic hybrid support structure applicable to a dashboard support of a vehicle provided to be assembled between two side elements of a frame of an automotive vehicle. The hybrid support structure comprises a metal tubular body and a plurality of plastic functional elements overmolded on said metal tubular body.

STATE OF THE ART

Automotive vehicles have several support structures, such as for example a structural element in the form of a support cross member assembled between two side elements of the frame, generally side pillars, next to a front part of the vehicle interior. This structural element provides rigidity to the frame, especially in the event of receiving a side impact, and integrates a plurality of functional elements to support different elements or components of the vehicle, including the dashboard, the steering column, one or more airbags, fuse box, ventilation, heating and air conditioning ducts, sound system, etc. Many of these components need electric power connections and/or signals; therefore the structure furthermore has a function of supporting wires or wiring harnesses.

A classic construction for said support structure of the dashboard comprises an elongated metal body extending from one end of the support structure to the other and a plurality of functional elements, which are obtained, for example, by sheet metal drawing, and attached to said elongated metal body by welding. A support structure built in this manner is very heavy and also very expensive, since it first requires the separate manufacture of a large number of different functional elements made of sheet metal, which can sometimes be more than twenty in number, and then such elements must be welded to the elongated metal body in the respective required positions.

International patent application WO 02/068257 describes an integral structure made of metal and plastic for a front-end module of a vehicle. In one embodiment, the integral structure comprises a body obtained by sheet metal drawing, with several metal fastening elements formed therein or welded thereto, each of which defines a projecting stem and a head, and a functional element obtained by the overmolding of a plastic material on part of the metal body, embedding said fastening elements. However, the mentioned body obtained by sheet metal drawing provides a structural element with an open profile that is not very suitable for withstanding impacts, especially impacts in the axial direction and torsional stresses, and therefore the metal body must be reinforced by means of an extensive framework of ribs defined by the plastic functional element overmolded thereon.

Document EP-A-1842714 discloses a support assembly for a vehicle dashboard, comprising a metallic support structure including a tubular cross beam provided at its ends with fastening elements for fastening the support assembly to the body of a vehicle, and a structure made of plastic material, overmoulded on the metal support structure and provided with integral functional elements for attaching dashboard components and/or devices to the support assembly. The tubular cross beam includes recessed areas filled and covered by the plastic material. However, the attachment between the metallic support structure and the structure made of plastic material provided by said recessed areas filled and covered by the plastic material can result insufficient against forces and torques to which a support assembly for a vehicle dashboard is generally subjected.

SUMMARY OF THE INVENTION

The present invention provides a metal-plastic hybrid support structure applicable to a dashboard support of a vehicle comprising a metal structural body and a plastic body overmolded thereon defining a plurality of plastic functional elements. This metal-plastic hybrid support structure is lightweight, strong and inexpensive to manufacture. In one embodiment, the hybrid support structure of the present invention is configured to allow an easy separation of the metal parts and plastic parts at the end of its service life for recycling purposes. The mentioned metal structure comprises an elongated metal tubular body having a closed cross section profile, with a plurality of projecting metal fastening elements fixed thereto. The mentioned overmolded plastic body defines a plurality of plastic functional elements overmolded on different regions of the metal tubular body, in which the plastic material of at least one of said functional elements embeds at least one of the projecting metal fastening elements.

Thus, the projecting metal fastening elements attached to the metal tubular body and embedded in the overmolded plastic functional elements ensure a firm attachment between the plastic functional elements and the metal tubular body.

In one embodiment, the projecting metal fastening elements are distributed along the metal tubular body and the plastic material of each functional element embeds one of said projecting metal fastening elements. In another embodiment, the metal tubular body has surface recesses and/or projections, obtained for example by knurling or grooving an outer surface of the metal tubular body in one or more regions thereof, and the plastic material of the plastic body, for example the plastic of one or more of the functional elements, embeds said surface recesses and/or projections providing a metal-plastic attachment. Thus, for example, the plastic material of those functional elements subjected to greater torsional stresses can be overmolded preferably embedding projecting metal fastening elements fixed to the metal tubular body, whereas the plastic material of those functional elements subjected to lower torsional stresses can be overmolded embedding only the mentioned surface recesses and/or projections of the metal tubular body. It is also possible for the plastic material of one or more of the functional elements to be overmolded embedding both surface recesses and/or projections formed in the metal tubular element and one or more of the projecting metal fastening elements fixed to the metallic tubular element.

The overmolded plastic body optionally defines at least one structural wall extending from an outer surface of the metal tubular body outwardly and along at least one portion thereof. This structural wall is sized to increase the moment of inertia of the metal tubular body, since the structural wall provides, together with the metal tubular body, a cross section area with a desired moment of inertia greater than the moment of inertia of the metal tubular body alone. The structural wall will preferably be connected by at least one of its ends to one of the structural elements, and it will more preferably be connected by both ends to two of the adjacent structural elements. The structural wall is generally relatively thin and has a distal end from which flanges may extend in a direction perpendicular or oblique to the structural wall. In some cases, the base of the structural wall in contact with the metal tubular body has bulges or projections embedding a projecting metal fastening element fixed to the metal tubular body.

In some applications it may be necessary to incorporate a metal reinforcing element attached to the metal tubular body to reinforce one of the plastic functional elements overmolded at least partially thereon. In one embodiment, the metal reinforcing element is attached to the metal tubular body by welding or adhering. In another embodiment, the metal reinforcing element has one or more holes in a region in contact with the metal tubular body, and one of the projecting metal fastening elements is passed through each of said holes. The corresponding plastic functional element is overmolded at least partially on said metal reinforcing element embedding the projecting metal fastening element and the hole through which it is inserted. Thus, the plastic material of the functional element attaches the metal reinforcing element and the metal tubular body in cooperation with the holes and the projecting metal fastening elements embedded thereby without the need for welding or adhering.

Advantageously, each projecting metal fastening element comprises a stem having a longitudinal axis substantially perpendicular to the longitudinal direction of the metal tubular body, and said stem has at least one outer portion provided with surface embossments in contact with the plastic material. In practice, the mentioned surface embossments can be provided by an outer screw threading and the stems can be threaded bolts or threaded pins commercially available at a relatively low cost. The elongated tubular body can be obtained by cutting to size a straight pipe having a constant cross section, with a closed cross section profile having suitable dimensions and shape, and from a suitable metal material, such as for example steel or an aluminum alloy, which can be selected from a range of commercially available pipes or can be expressly manufactured at a relatively low cost, for example by roll forming or by extrusion. The elongated tubular body can alternatively have a variable cross section profile therealong and can be obtained by the coupling of two or more sections having different shapes and/or dimensions, or by deformation of a single tubular element having a constant cross section profile using any suitable shaping technique, such as for example crushing, hydroforming or lathe spinning. Though for constructive and economic reasons, it is advantageous for the metal tubular body, whether it has a uniform or variable cross section profile, to be completely straight, the present invention contemplates in some cases the possibility that the metal tubular body has some bends or an arched general configuration.

In a first manufacturing operation, the stems forming the projecting metal fastening elements are attached to the metal tubular body, for example by welding or adhering, or by screwing in corresponding holes formed in the metal tubular body, whereby obtaining a metal assembly formed by the metal tubular body and the projecting metal fastening elements attached thereto. In a second manufacturing operation, this metal assembly is placed within a mold configured to form the functional elements, and the plastic material is injected into the mold, such that the overmolded plastic material forms the different functional elements attached to the metal assembly. Generally, because of the needs of the molding technique, the mold has a sprue bushing at one point thereof and channels configured to distribute the molten plastic material towards the cavities of the mold forming the different functional elements. For this reason the plastic functional elements in the finished hybrid support structure are connected by one or more overmolded plastic chords in contact with the metal tubular body, which are formed by the mentioned channels of the mold. These plastic chords have no functional or structural role in the hybrid support structure and, though they are no obstacle, could be eliminated if it is considered necessary.

The metal tubular body is generally designed such that it is capable of providing by itself the strength required against bending, torsion and compressive stresses, and the plastic functional elements do not need to provide an additional reinforcing function for the metal tubular body. Given that the projecting metal fastening elements provide firm and reliable securing between the plastic functional elements and the metal tubular body, the plastic functional elements can have minimal dimensions, and this means a lower amount of plastic material and a reduction of the weight of the assembly compared to other hybrid structures of the state of the art. The closed cross section profile of the metal tubular body is especially favorable for withstanding deformations caused by compressive stresses in the axial direction thereof, such as those experienced in the event of side impact. It is common for different regions of the metal tubular body to be subjected to different stresses, especially different bending stresses, in which case a metal tubular body having a constant cross section profile capable of withstanding the greatest stress envisaged or a metal tubular body having a variable cross section profile with different regions sized to withstand the different stresses envisaged therein will be chosen. Alternatively, a metal tubular reinforcing body can be attached to the metal tubular body in a region thereof subjected to greater stress, in which case one or more of the plastic functional elements will be overmolded partially on the metal tubular body and partially on said metal tubular reinforcing body. There can optionally be fixed in the mentioned metal tubular reinforcing body one or more projecting metal fastening elements embedded by the plastic functional element. In any case, the thickness of the wall of the cross section profile of the metal tubular body, and accordingly the weight of the assembly, can be reduced by providing reinforcing ribs of overmolded plastic material arranged parallel to the longitudinal direction of the metal tubular body and provided by respective cavities in the mold during the overmolding operation.

In one embodiment applied to a dashboard support cross member of an automotive vehicle, the metal tubular body is configured to be assembled between two side elements of a frame of said vehicle. The region of the support structure subjected to greater stresses is generally a side region in which a plastic functional element forming a support for the steering column of the vehicle is overmolded, and this side region is what can optionally be reinforced by means of the metal tubular reinforcing body or by means of larger dimensions of the cross section profile of the tubular body, or even by means of reinforcing ribs defined by the overmolded plastic body. The mentioned steering column support is generally by itself also subjected to relatively large stresses, and in some cases, for the purpose of reducing the amount of overmolded plastic material without compromising the strength of the steering column support, it may be appropriate to arrange a metal reinforcing element attached to the metal tubular body and/or to the metal tubular reinforcing body, if there is one, in said first side region of the tubular body, forming part of the metal assembly to be introduced in the mold, and the steering column support can be overmolded by completely or at least partially embedding said metal reinforcing element.

To facilitate recycling the metal-plastic hybrid support structure at the end of its service life, the present invention envisages a system which allows easily separating the metal parts from the plastic parts. To that end, the stems forming the projecting metal fastening elements are fixed to said metal tubular body with a predetermined attachment force, either by welding or adhering, or by screwing. Furthermore, each of the projecting metal fastening elements has a distal end provided with a grip configuration suitable for being gripped by means of a hand-powered or motor-driven rotary tool which reaches the end of the stem through a corresponding opening formed in the plastic functional element. If the stem is attached to the tubular body or tubular reinforcing member by welding or adhering, said welding or adhering will be a type of welding or adhering that can be broken with a torsional stress or torque applied to the stem by said rotary tool. Once the welding or adhering is broken, subsequent continued rotation of the stem under the action of the tool will make the stem move out of the plastic material by virtue of the outer screw threading in contact with the overmolded plastic material until the complete extraction of the metal stem. Then the plastic functional element is released so that it may be slid along the metal tubular body until it is separated therefrom. If the stem is screwed into a threaded hole of the metal tubular body or of the metal tubular reinforcing body, the same continued rotation applied to the stem by the rotary tool will reverse the screwed attachment between the stem and the metal tubular body and extract the stem from the plastic. Next, the plastic functional element can be slid along the metal tubular body until it is separated therefrom.

According to one embodiment, to facilitate carrying out assembly operations during the manufacture of the hybrid support structure and disassembly operations for the recycling thereof, especially when automated mechanical means are used, all the stems forming the projecting metal fastening elements are arranged with their longitudinal axes in one plane and substantially parallel to a demolding direction, such that once the tubular body is arranged in a predetermined angular position, it only needs to be moved forward step by step in the direction of its longitudinal axis to successively align the different places in which the stems are or should be fixed with a rotary tool installed in a head of a stem installing or extracting apparatus, without the need for rotating the metal tubular body with respect to its longitudinal axis. In the event of needing projecting metal fastening elements oriented in different directions, it is envisaged to arrange a first group of the stems forming the projecting metal fastening elements with their longitudinal axes in a first plane and substantially parallel to a demolding direction of the plastic material and a second group of the stems forming the projecting metal fastening elements with their longitudinal axes in a second plane and substantially perpendicular to said demolding direction, in which the second group will typically be at an angle of 90 degrees with respect to the first plane and coinciding with a partition line of the mold.

The stem forming each projecting metal fastening element according to one embodiment has the shape of a bolt attached by butt joint welding or adhering on the outer surface of the metal tubular body or attached by screwing in a threaded hole formed in the metal tubular body. According to another alternative embodiment, each stem has the shape of a threaded pin passed through two aligned holes formed in opposite areas of the metal tubular body such that two opposite end regions of the stem project, providing two respective projecting metal fastening elements on opposite sides of the tubular body or of the tubular reinforcing member. In this case, the stem can be fixed to the corresponding metal tubular body by welding or adhering, or by screwing in at least one of said two aligned holes. Thus, two stems can be installed or extracted at the same time with a single operation. In the case of the screwed in attachments, the corresponding holes formed in the metal tubular body can be previously provided with an inner threading, for example when the metal material of the tubular body is relatively hard, such as steel, or can be configured to receive stems provided with outer self-screwing threading, for example when the metal material of the tubular body is relatively soft, such as an aluminum alloy.

BRIEF DESCRIPTION OF THE DRAWINGS

The foregoing and other advantages and features will become more evident from the following detailed description of several embodiments with reference to the attached drawings, in which:

FIG. 2 is a front view of the hybrid support structure of FIG. 1;

FIGS. 3, 4, 5 and 6 are enlarged cross section views taken respectively along the indicated planes III-III, IV-IV, V-V and VI-VI in FIG. 2;

FIG. 7 is a partial perspective view of a metal assembly forming part of the hybrid support structure of the first embodiment;

FIG. 7A is a perspective view showing an optional detail of a metal tubular body forming part of the metal assembly;

FIG. 8 is a magnified partial side view of an end portion of a stem forming a projecting metal fastening element in the metal assembly of FIG. 7;

FIG. 9 is a partial perspective view of the hybrid support structure of the first embodiment and of a rotary tool which can be used to install or remove the stems;

DETAILED DESCRIPTION OF EXEMPLARY EMBODIMENTS

Figure 1:
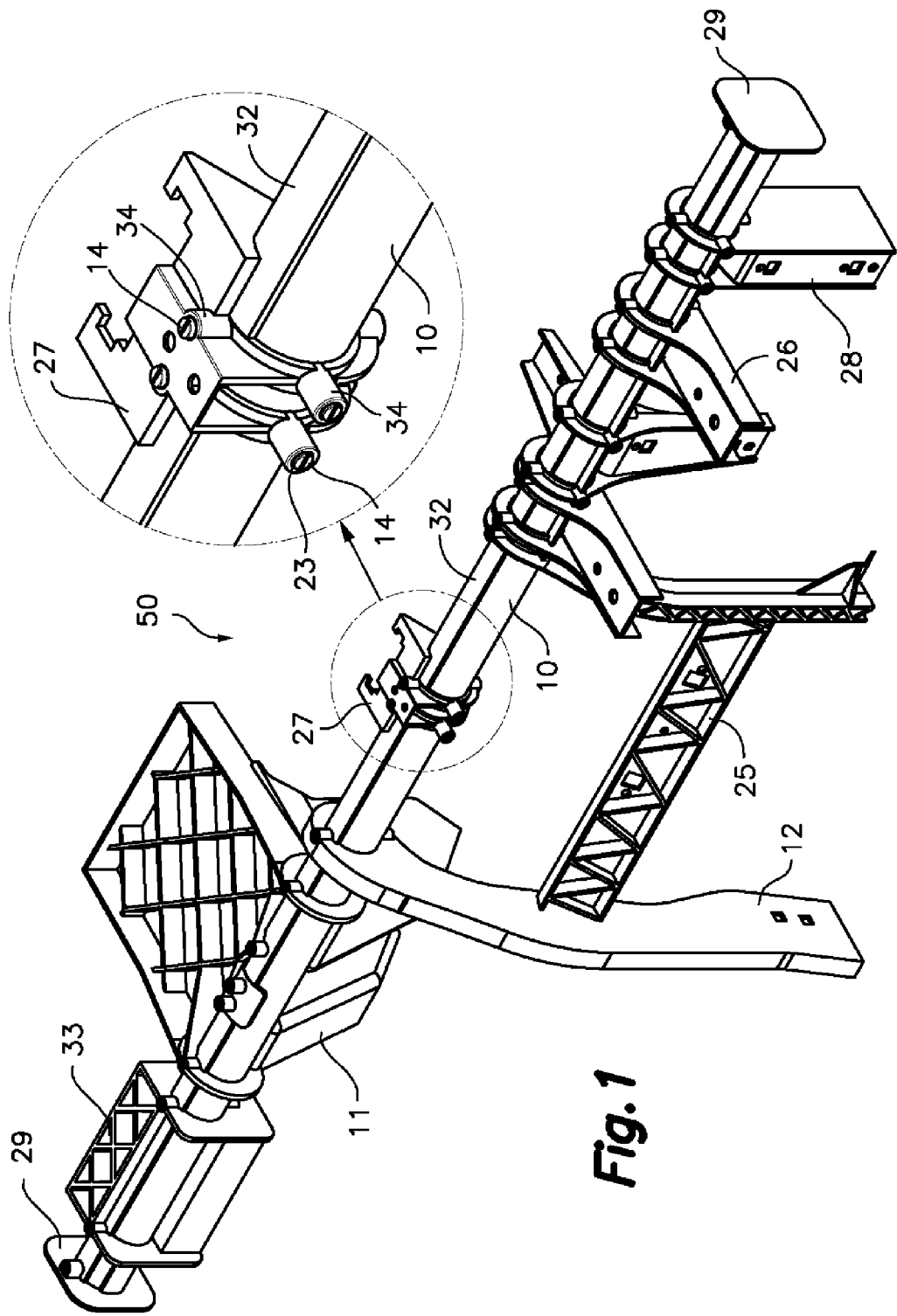
FIG. 1 is a perspective view of a metal-plastic hybrid support structure applicable to a dashboard support of a vehicle according to a first embodiment of the present invention, with a magnified detail.

Referring first to FIGS. 1 to 9, a metal-plastic hybrid support structure applicable to a dashboard support of a vehicle according to a first embodiment of the present invention is generally designated with reference numeral 50. In this first embodiment, the hybrid support structure 50 comprises a metal tubular body 10 having a closed cross section profile and suitable length to be assembled between two opposite side elements of the frame of an automotive vehicle, transverse to the forward movement direction of the vehicle. This metal tubular body 10 is a structural element separating the vehicle interior compartment from a motor compartment and supporting a dashboard of the vehicle. The metal tubular body 10 of the first embodiment is a straight pipe having a circular cross section profile that is constant along the same. A plurality of separate plastic functional elements are overmolded on different regions of the metal tubular body 10, which elements include, for example, a steering column support 11 in a first side region of the metal tubular body 10, at least one support leg 12 and a console support 25 in a central region of the metal tubular body 10, one or more airbag supports 26 in a second side region of the metal tubular body 10, as well as several cable harnesses supports 27 and other supports 28 for other components.

At the ends of the metal tubular body 10 there are anchor plates 29 only diagrammatically depicted in FIGS. 1 and 2, which in the example shown are also made of overmolded plastic material, although they could alternatively be made of a metallic material attached to the metal tubular body 10 by welding or adhering. Since all the plastic functional elements 11, 12, 25-29 are obtained by means of a single overmolding operation in a mold, all the plastic functional elements 11, 12, 25-29 are connected to one another by one or more plastic chords 32 in contact with the metal tubular body 10 as a result of channels for the flow of the molten plastic material connecting cavities for the different functional elements in the mold.

As shown in FIG. 7, to ensure the fixing of the overmolded plastic material forming the functional elements 11, 12, 25-29 to the metal tubular body 10, a plurality of projecting metal fastening elements 14 are fixed to the metal tubular body 10 and distributed in different regions along the same in preselected positions. These projecting metal fastening elements 14 preferably comprise a stem substantially perpendicular to the longitudinal direction of the metal tubular body 10, and surface embossments formed at least in an outer portion of said stem, such that in the hybrid support structure 50 the mentioned surface embossments are in contact with the overmolded plastic material of the functional elements 11, 12, 25-29. The mentioned surface embossments of the stems forming the projecting metal fastening elements 14 are advantageously provided by an outer screw threading of the stem, which means that a commercially available type of threaded bolts or pins can be used as projecting metal fastening elements 14. The plurality of plastic functional elements 11, 12, 25-29 in the hybrid support structure 50 are overmolded on different separate regions of the metal tubular body 10 in which the projecting metal fastening elements 14 are fixed, such that each plastic functional element 11, 12 embeds one or more of the projecting metal fastening elements 14. FIG. 7 partially shows only the metal tubular body 10 with the projecting metal fastening elements 14 fixed thereto, and also an optional metal reinforcing element 24 attached to the metal tubular body 10, for example by welding or adhering, on which said steering column support 11 (FIG. 3) is overmolded.

The metal tubular body 10 optionally has, in one or more regions thereof, surface recesses and/or projections 39, shown in FIG. 7A, on which one or more portions of the plastic body, for example one or more of the plastic functional elements 11, 12 (not shown in FIG. 7A), are overmolded such that the plastic material embeds said surface recesses and/or projections 39 establishing a degree of attachment between the metal and the plastic that is sufficient to withstand small torsional stresses without the need for projecting metal fastening elements 14. Obviously, in one and the same region of the metal tubular body 10 there can simultaneously be surface recesses and/or projections 39 and one or more projecting metal fastening elements 14 embedded in the plastic functional element. These surface recesses and/or projections can be easily formed by surface deformation, for example by knurling, or by stripping off surface material, for example by grooving.

FIG. 8 shows a distal portion of one of such threaded bolts or pins forming the projecting metal fastening elements 14 in the hybrid support structure 50 of this first embodiment. The threaded bolt or pin of FIG. 8 further comprises a grip configuration 21 suitable for being gripped by means of a rotary tool 22, such as for example the one shown in FIG. 9. In the hybrid support structure 50 of the first embodiment shown in FIGS. 1 to 9, the stems forming the projecting metal fastening elements 14 are attached to the metal tubular body 10 with a predetermined attachment force, and are provided with the corresponding grip configuration 21, which can be reached through an opening 23 (FIG. 9) formed in the plastic material. In other words, the plastic material of the functional elements embeds the screw threaded portions of the stems forming the projecting metal fastening elements 14 but said openings 23 leave the distal end of each stem where the grip configuration 21 is formed exposed.

Thus, as depicted in FIG. 9, the grip configuration 21 can be gripped by means of the mentioned rotary tool 22 to apply a predetermined torque to the stem which is capable of overcoming the mentioned predetermined attachment force between the stem and the metal tubular body 10. Once the attachment between the stem and the metal tubular body 10 is broken, a subsequent rotation of the stem transmitted by the rotary tool 22, and by virtue of the outer screw threading of the stem in cooperation with the inner screw threading formed in the overmolded plastic material thereon, the projecting metal fastening element 14 is extracted through the opening 23 and thereby the plastic functional element 11, 12, 25-29 partially released, which element can then be separated from the metal tubular body 10 sliding it axially to the end thereof for recycling purposes. In FIGS. 8 and 9, the grip configuration 21 of the stems forming the projecting metal fastening elements 14 is a transverse groove and the rotary tool 22 a hand-powered screwdriver. Nevertheless, it will alternatively be understood that the grip configuration can have any other suitable shape for being gripped by a corresponding hand-powered or motor-driven rotary tool.

Now in relation to FIGS. 10-13, different alternative examples of how the stems forming the projecting metal fastening elements 14 can be fixed to the metal tubular body 10 according to the first embodiment are described below.

Figure 10:
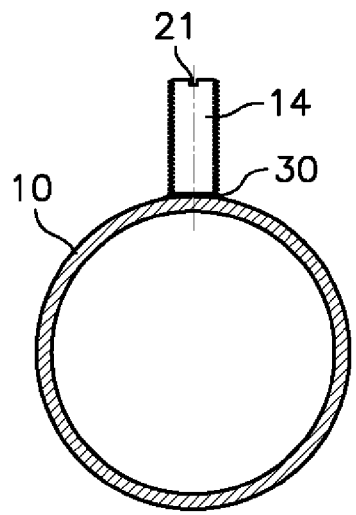
FIGS. 10, 11, 12 and 13 are enlarged cross section views showing different ways of fixing the stems forming the projecting metal fastening elements to the metal tubular body according to the first embodiment.

In FIG. 10, the stem forming the projecting metal fastening element 14 is arranged by butt jointing on the metal tubular body 10 and fixed thereto by a weld 30 in the base. The weld 30 can be broken by the torque applied by means of said rotary tool 22 coupled to the grip configuration 21 of the stem. The welding 30 can alternatively be replaced by an adherence that can be broken by said torque.

Figure 11:
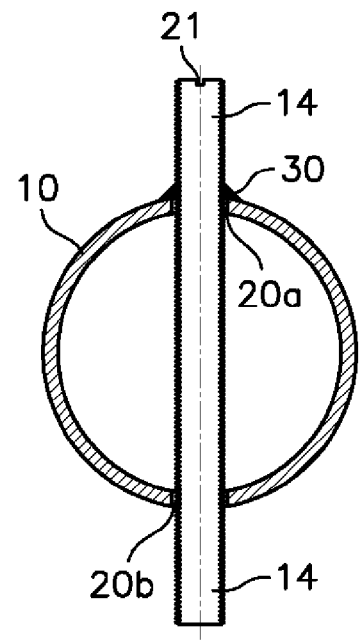

In FIG. 11, the stem forming the projecting metal fastening element 14 is passed through two holes 20a, 20b formed in opposite areas of the metal tubular body 10 and aligned with one another. The holes 20a, 20b are not threaded and the stem is attached to the metal tubular body 10 by means of a weld 30 in a region adjacent to one of the two holes. The stem has a suitable length so that two end regions thereof project on both sides of the metal tubular body 10 providing two respective projecting metal fastening elements 14 in said opposite areas of the metal tubular body 10. The weld 30 can be broken by the torque applied by means of the rotary tool 22 coupled to the grip configuration 21 of the stem. The weld 30 can alternatively be replaced by an adherence that can be broken by said torque.

Figure 12:
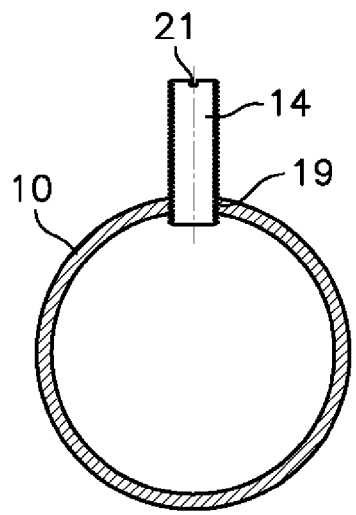

In FIG. 12, the stem forming the projecting metal fastening element 14 is fixed to the metal tubular body 10 by screwing said outer screw threading in a corresponding hole 19 with inner screw threading formed in the metal tubular body 10. The hole 19 could alternatively not be provided with screw threading and the stem could have an outer self-screwing threading. In any case, the screwed in attachment of the stem to the hole 19 is reversible by the torque applied by means of the rotary tool 22 coupled to the grip configuration 21 of the stem.

Figure 13:
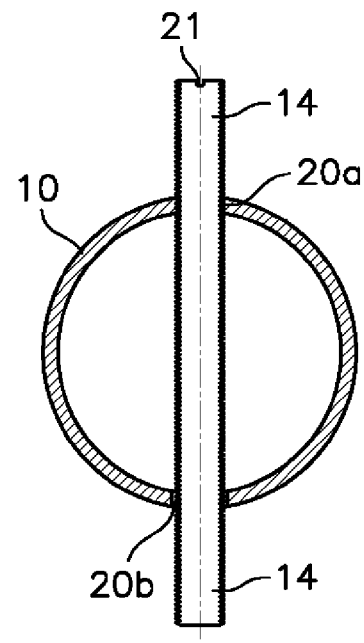

In FIG. 13, the stem forming the projecting metal fastening element 14 is passed through two aligned holes 20*a*, 20*b* formed in opposite areas of the metal tubular body 10. One of the two holes 20*a* has inner screw threading, and the outer screw threading of the stem is screwing into said threaded hole 20*a*. The stem is long enough so that two end regions projecting therefrom provide two respective projecting metal fastening elements 14 in said opposite areas of the metal tubular body 10. The screwed in attachment of the stem to the hole 19 is reversible by the torque applied by means of the rotary tool 22 coupled to the grip configuration 21 of the stem.

FIG. 3 shows a cross section of a functional element forming the steering column support 11. In the plane of the cross section shown, the plastic material of the steering column support 11 is overmolded partially on the metal tubular body 10 and on said metal reinforcing element 24 embedding one of the projecting metal fastening elements 14, which is fixed to the metal tubular body 10 as described above in relation to FIG. 10. The plastic material of the steering column support 11 completely embeds the metal reinforcing element 24 although alternatively it could cover it only partially. In the plane of the cross section shown in FIG. 3, the plastic material of the steering column support 11 only partially surrounds the metal tubular body 10, although in other planes the plastic material completely surrounds the metal tubular body 10.

FIG. 4 shows a cross section of a functional element forming the cable harness support 27. In the plane of the cross section shown, the plastic material of the cable harness support 27 is overmolded on the metal tubular body 10, completely surrounding it and embedding three of the projecting metal fastening elements 14 having their axes in one and the same plane. Two of the projecting metal fastening elements 14 are provided by a single stem fixed to the metal tubular body 10 as described in relation to FIG. 11 or FIG. 13, whereas the other one is provided by a stem fixed to the metal tubular body 10 as described in relation to FIG. 10, although it could alternatively be as described in relation to FIG. 12.

FIG. 5 shows a cross section of a functional element forming the airbag support 26. In the plane of the cross section shown, the plastic material of the airbag support 26 is overmolded on the metal tubular body 10, completely surrounding it and embedding two of the projecting metal fastening elements 14 provided by a single stem fixed to the metal tubular body 10 as described in relation to FIG. 11 or FIG. 13.

FIG. 6 shows a cross section of a functional element forming a support 28 for a component. In the plane of the cross section shown, the plastic material of the support 28 is overmolded on the metal tubular body 10, completely surrounding it and embedding three of the projecting metal fastening elements 14, the axes of which are in one and the same plane. Two of the projecting metal fastening elements 14 are provided by a single stem fixed to the metal tubular body 10 as described in relation to FIG. 11 or FIG. 13, whereas the other one is provided by a stem fixed to the metal tubular body 10 as described in relation to FIG. 10, although it could alternatively be as described in relation to FIG. 12.

In the hybrid support structure 50 of the first embodiment, a first group of the stems forming the projecting metal fastening elements 14 are arranged with their longitudinal axes parallel to one another and in a first plane substantially parallel to a demolding direction of the plastic material of the functional elements 11, 12, 25-29, whereas a second group of the stems forming the projecting metal fastening elements 14 are arranged with their longitudinal axes parallel to one another and in a second plane substantially perpendicular to said demolding direction. This arrangement allows demolding and facilitates both the assembly of the projecting metal fastening elements 14 to the metal tubular body 10 and the extraction of the projecting metal fastening elements 14 for recycling purposes. All the stems forming the projecting metal fastening elements 14 of the hybrid support structure 50 could alternatively be arranged with their longitudinal axes parallel to one another and in one and the same plane substantially parallel to the demolding direction for the same purposes.

Figure 14:
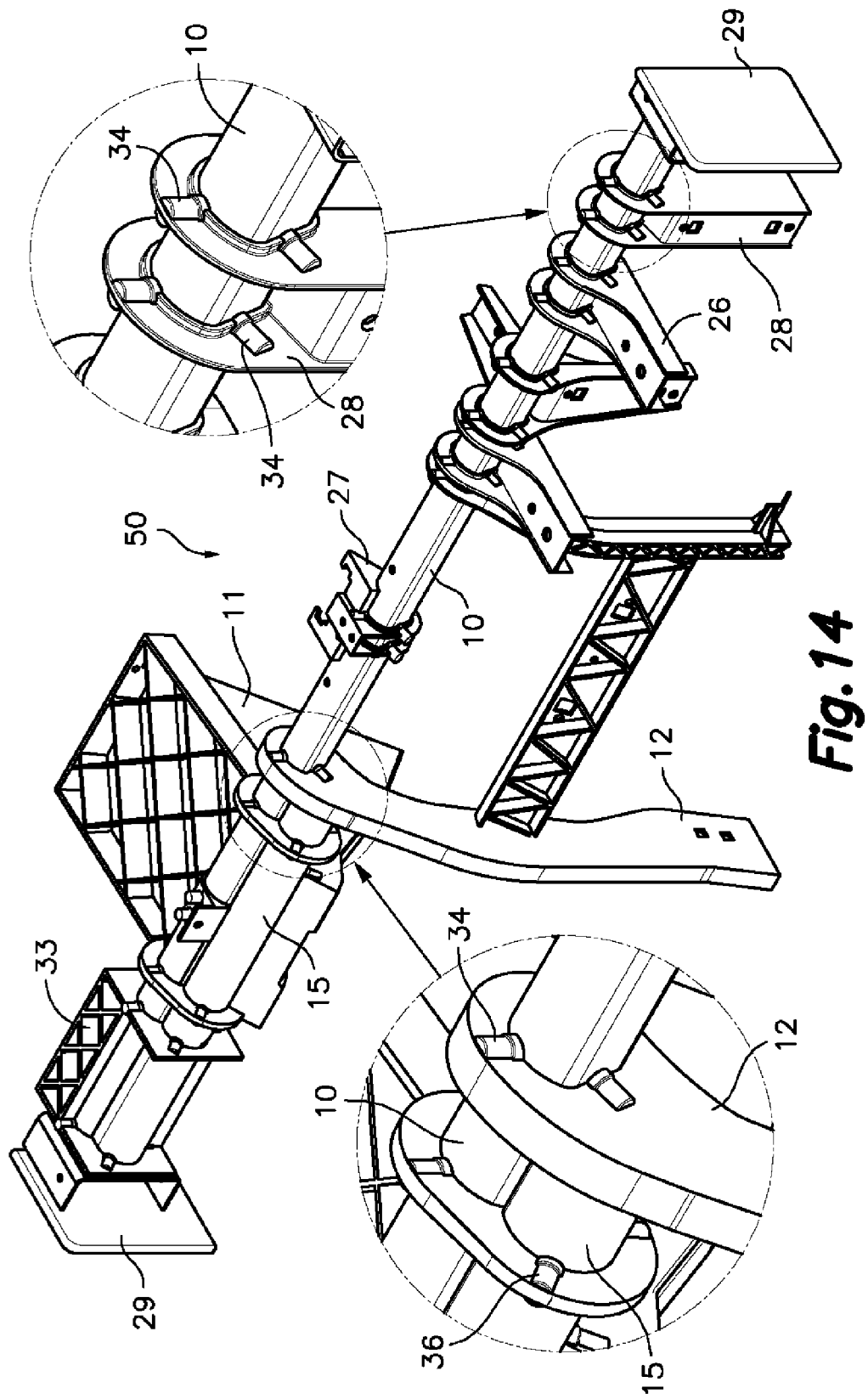
FIG. 14 is a perspective view of a metal-plastic hybrid support structure applicable to a dashboard support of a vehicle according to a second embodiment of the present invention, with magnified details.
Figure 15:
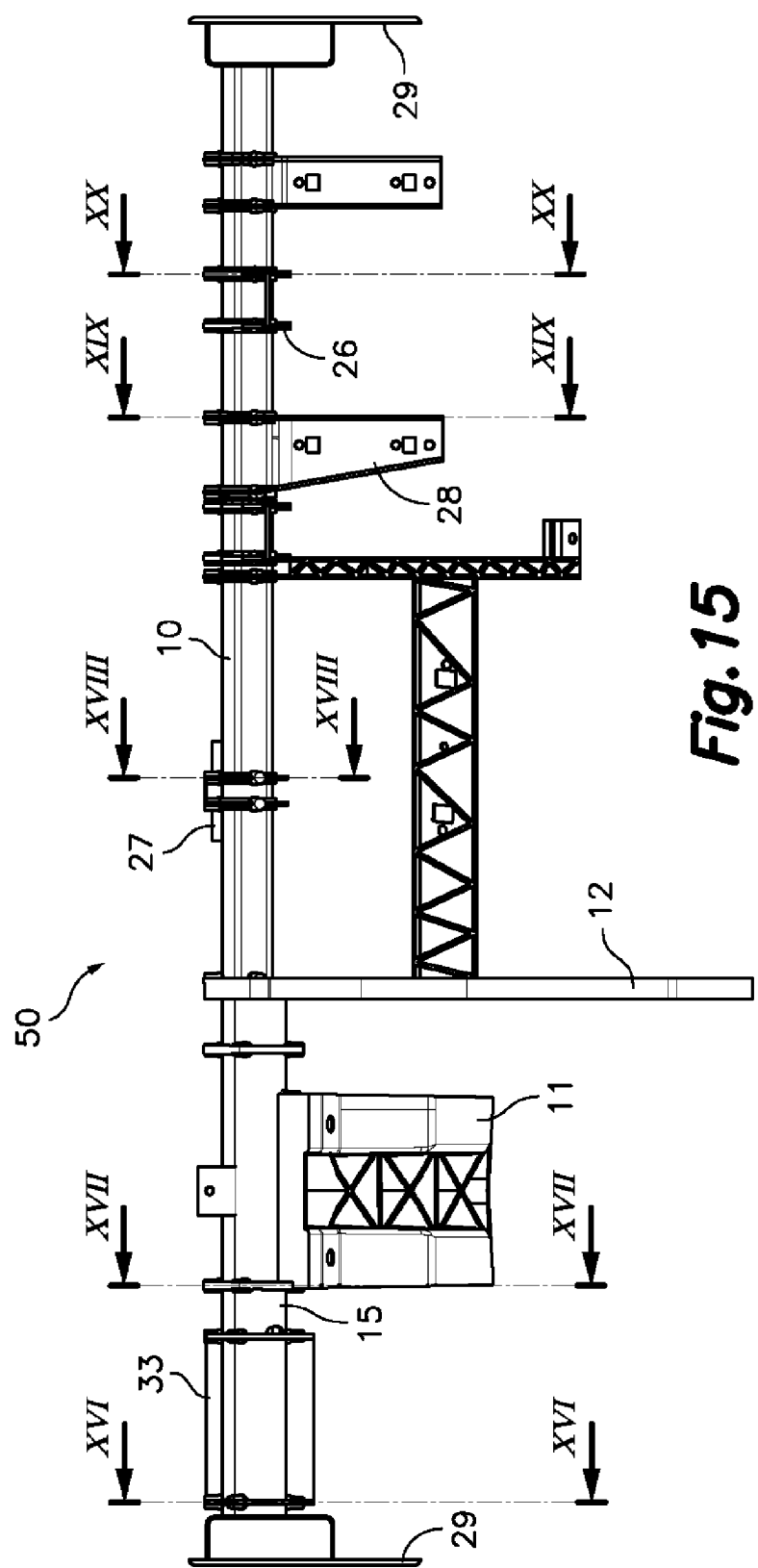
FIG. 15 is a front view of the hybrid support structure of FIG. 10.

FIGS. 14-21 now describe a hybrid support structure 50 applied to a dashboard support of a vehicle according to a second embodiment of the present invention. As shown in FIG. 14, the hybrid support structure 50 of this second embodiment comprises a metal tubular body 10 made of a straight pipe having a constant closed cross section profile along the same, and having a flat facet in the longitudinal direction. In a first side region of the metal tubular body 10 there is fixed a metal tubular reinforcing body 15 which, in the example shown, is a piece of pipe having the same features as the metal tubular body 10. The metal tubular body 10 and the metal tubular reinforcing body 15 are mutually fixed, for example, by welding or adhering, with the respective planar facets facing and in contact. In the metal tubular body 10 there are fixed projecting metal fastening elements 14 in separate regions thereof, and in said metal tubular reinforcing body 15 there are fixed other projecting metal fastening elements 16 having the same features. Each of the projecting metal fastening elements 14, 16 preferably comprises a stem substantially perpendicular to the longitudinal direction of the corresponding metal tubular body 10 or metal tubular reinforcing body 15, with surface embossments formed in an outer portion of the stem. A plurality of plastic functional elements 11, 12, 25-29 are overmolded on the structural metal assembly formed by the metal tubular body 10 and the metal tubular reinforcing body 15, such that some of the plastic functional elements, for example, a support leg 12, a console support 25, one or more airbag supports 26, several cable harness supports 27, other supports 28 for other components, and an end anchor plate 29 are overmolded only on the metal tubular body 10 embedding one or more of the projecting metal fastening elements 14, whereas other plastic functional elements, for example the steering column support 11, are overmolded partially on the metal tubular body 10 embedding one or more of the projecting metal fastening elements 14 and partially on the metal tubular reinforcing body 15 embedding one or more of the projecting metal fastening elements 16.

Figure 21:
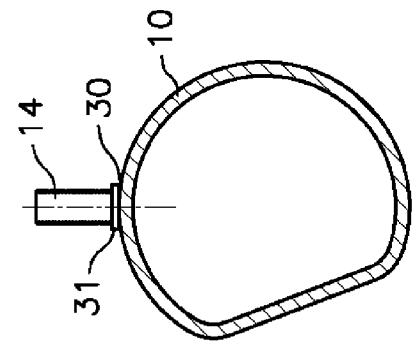
FIG. 21 is an enlarged cross section view showing the way of fixing a stem forming a projecting metal fastening element to the metal tubular body according to the second embodiment.

As is best shown in FIG. 21, in this second embodiment, each of the projecting metal fastening elements 14, 16 comprises a stem with outer screw threading and provided with a collar 31 around its proximal end and not having the grip configuration at its distal end, whereby the hybrid support structure 50 of the second embodiment is not prepared to facilitate recycling. The types of stems forming the projecting metal fastening elements 14, 16 are commercially available and are provided to be attached by butt jointing on the outer surface of the metal tubular body 10 or metal tubular reinforcing body 15 by means of a welding 30.

Figure 16:
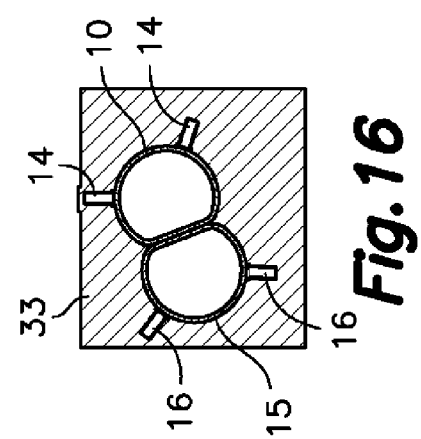

FIG. 16 shows a cross section of a functional element forming a support 33 for a component. In the plane of the cross section shown, the plastic material of the support 33 is overmolded partially on the metal tubular body 10 embedding two of the projecting metal fastening elements 14 fixed thereto and partially on the metal tubular reinforcing body 15 embedding two of the projecting metal fastening elements 16 fixed thereto. The plastic material of the support 33 completely surrounds the structural metal assembly formed by the metal tubular body 10 and the metal tubular reinforcing body 15.

Figure 17:
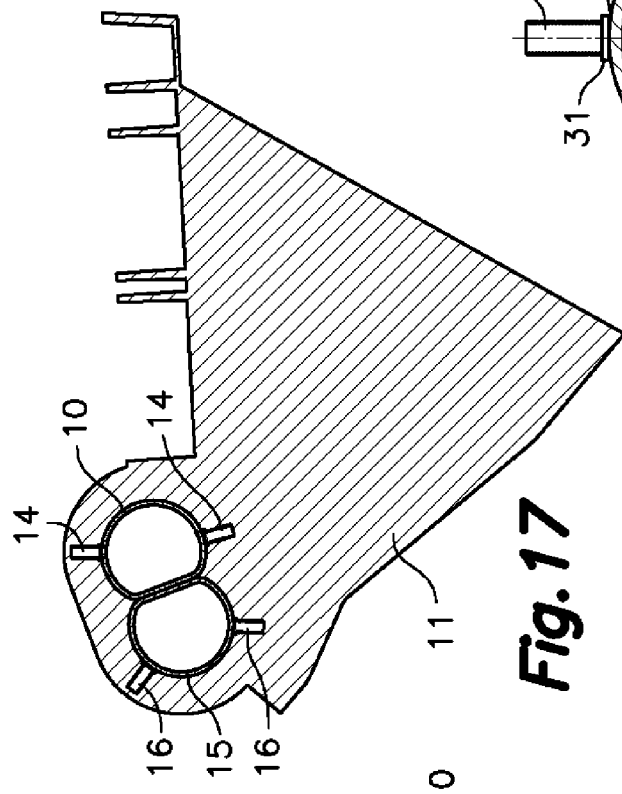
FIGS. 16, 17, 18, 19 and 20 are enlarged cross section views taken respectively along the indicated planes XVI-XVI, XVII-XVII, XVIII-XVIII, XIX-XIX and XX-XX in FIG. 15.

FIG. 17 shows a cross section of a functional element forming the steering column support 11. In the plane of the cross section shown, the plastic material of the steering column support is overmolded partially on the metal tubular body 10 embedding two of the projecting metal fastening elements 14 fixed thereto and partially on the metal tubular reinforcing body 15 embedding two of the projecting metal fastening elements 16 fixed thereto. In this case, the plastic material of the steering column support 11 completely surrounds the structural metal assembly formed by the metal tubular body 10 and the metal tubular reinforcing body 15 and does not have a metal reinforcing element therein.

Figure 18:
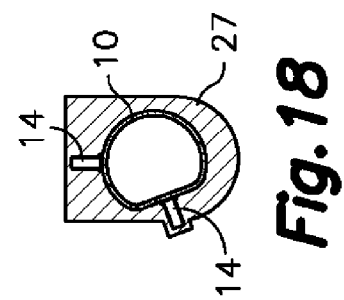

FIG. 18 shows a cross section of a functional element forming the cable harness support 27. In the plane of the cross section shown, the plastic material of the cable harness support 27 is overmolded only on the metal tubular body 10, completely surrounding it and embedding two of the projecting metal fastening elements 14.

Figure 19:
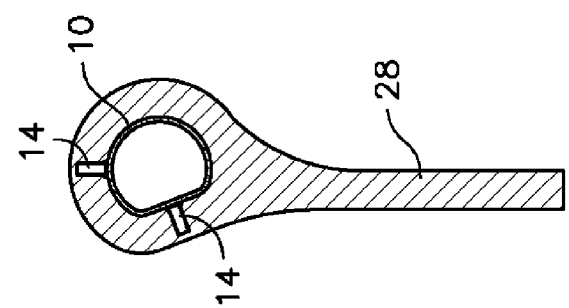

FIG. 19 shows a cross section of a functional element forming a support 28 for a component. In the plane of the cross section shown, the plastic material of the support 28 is overmolded only on the metal tubular body 10, completely surrounding it and embedding two of the projecting metal fastening elements 14.

Figure 20:
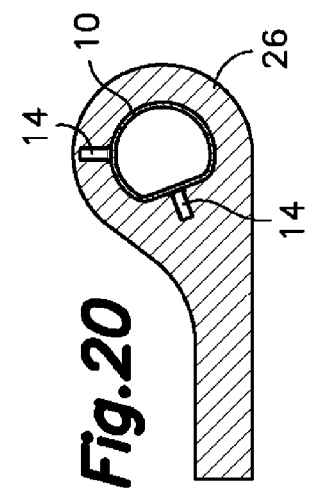

FIG. 20 shows a cross section of a functional element forming an airbag support 26. In the plane of the cross section shown, the plastic material of the airbag support 26 is overmolded only on the metal tubular body 10, completely surrounding it and embedding two of the projecting metal fastening elements 14.

The plastic structural elements of the hybrid support structure 50 are formed by relatively thin reinforcing ribs and walls to provide the required strength with the smallest possible amount of plastic material. In FIGS. 4-6 of the first embodiment and in FIGS. 16-20 of the second embodiment, the planes of the cross sections shown pass through the axes of the projecting metal fastening elements 14, 16 and furthermore through the center of respective reinforcing ribs, which may give the false impression that the plastic structural elements are solid. In the regions in which the plastic material of the structural elements is in contact with the projecting metal fastening elements 14, 16, the relatively thin ribs and walls of the structural elements have bulges or projections 34, 36 at least laterally covering the projecting metal fastening elements 14, 16, as is best shown in the magnified details of FIGS. 1, 9 and 14.

Figure 22:
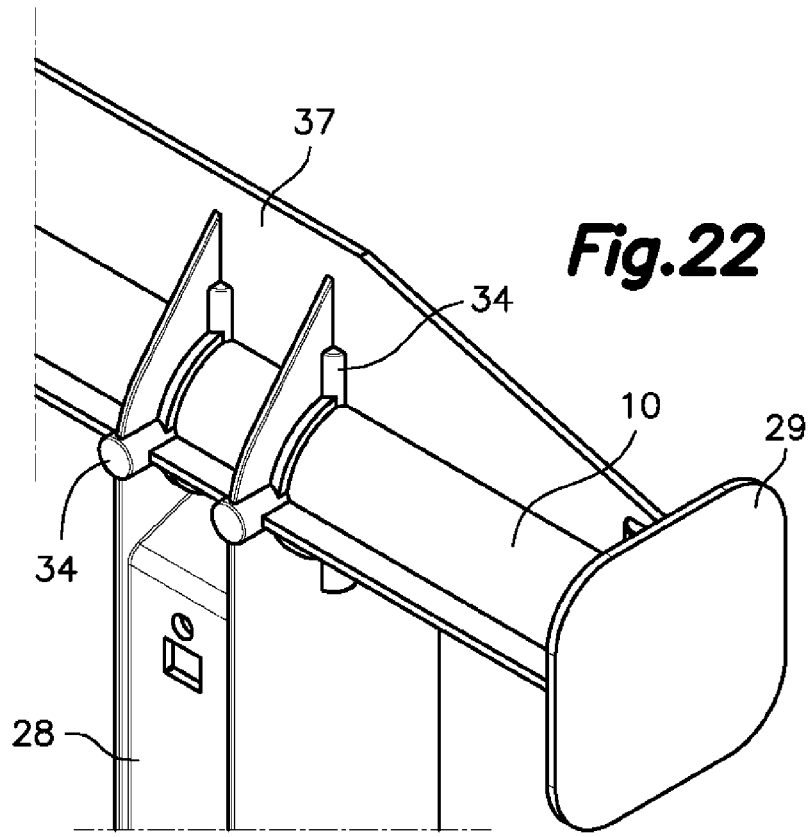
FIG. 22 is a partial perspective view of a metal-plastic hybrid support structure of the present invention including a structural wall.

*In FIG. 22 an optional feature of the hybrid support structure of the present invention is shown, where the overmolded plastic body defines a structural wall 37 extending from an outer surface of the metal tubular body 10 outwardly and along a portion thereof. This structural wall 37 is sized to provide together with the metal tubular body 10 a cross section area with a desired moment of inertia. In the example shown, the structural wall 37 is laterally connected to functional elements 28, 29 and has a base in contact with the metal tubular body 10. The plastic material of the functional elements 28, 29 forms bulges or projections 34 in which corresponding projecting metal fastening elements 14 fixed to the metal tubular body 10 are embedded. The base of the structural wall 37 can optionally also include bulges or projections 34 embedding projecting metal fastening elements 14 fixed to the metal tubular body 10. Although they are not shown in FIG. 22, flanges can extend laterally from the distal end of the structural wall 37 to configure, for example, a T-, L- or Y-shaped cross section profile for the assembly of the structural wall with the flanges. The overmolded plastic body can further define reinforcing ribs (not shown) connecting the structural wall 37 and the outer surface of the metal tubular body 10, and optionally the plastic functional elements 28, 29.

Figure 23:
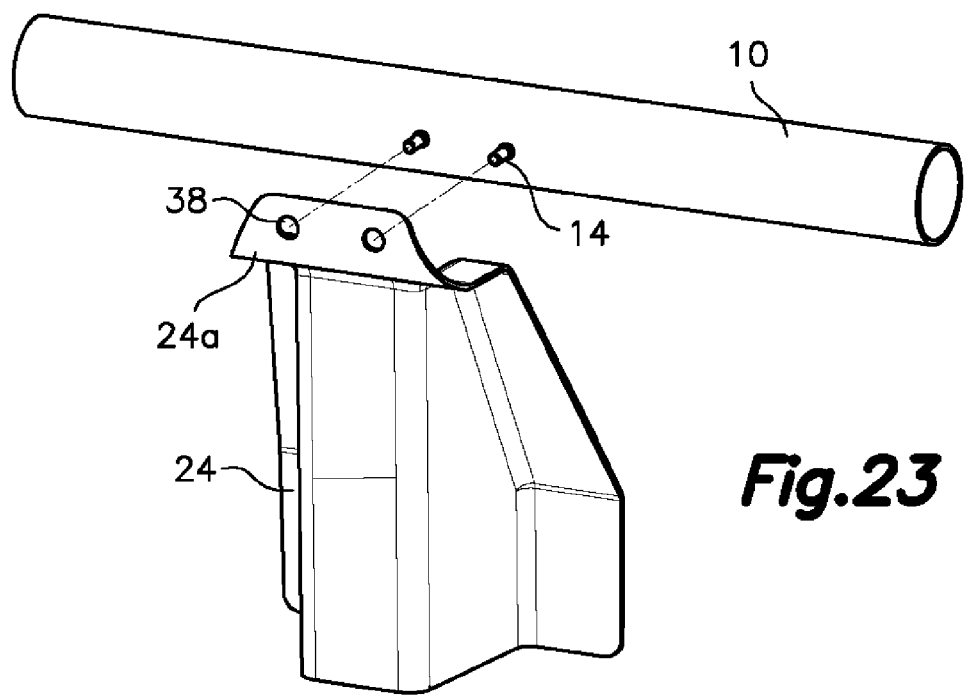
FIG. 23 is a partial perspective view showing the attachment of a metal reinforcing element and a metal tubular body in the metal part of the metal-plastic hybrid support structure of the present invention.

In relation to FIG. 23, the attachment of the metal reinforcing element 24 to the metal tubular body 10 is described in an alternate manner with respect to the welding or adhering described above in reference to FIG. 7. Here, the metal reinforcing element 24 has a region 24*a* provided to be in contact with the metal tubular body 10 in which a pair of holes 38 are formed, and two of the projecting metal fastening elements 14 fixed to the metal tubular body 10 will be passed through said holes 38 such that they project on the outer side of the metal reinforcing element 24. Similarly to that described above in relation to FIG. 3, after the overmolding operation, a portion of the plastic body, for example part of a functional element in the form of a steering column support 11, is overmolded partially on said metal reinforcing element 24 and partially on the metal tubular body 10 embedding in this case the projecting metal fastening elements 14 and the holes 38 through which they are inserted, thus establishing a strong attachment between the metal reinforcing element 24, the metal tubular body 10 and the overmolded plastic body without the need for welding or adhering.

A person skilled in the art will be able to make modifications and variations based on the embodiments shown and described without departing from the scope of the present invention. For example, the metal tubular body 10 can have some bends or a slight general curve instead of being completely straight, and/or it can have a variable cross section profile along the same instead of being a constant cross section profile. It will also be understood that the metal-plastic hybrid support structure of the present invention can be applied, in addition to a dashboard support, to other components of a vehicle such as, for example, a reinforcing bumper cross member, a front end support structure, etc.

The scope of the present invention is defined in the attached claims.

The invention claimed is:

1. A metal-plastic hybrid support structure applicable to a dashboard support of a vehicle, comprising:
   a metal structure comprising an elongated metal tubular body having a closed cross section profile and suitable length to be assembled between two opposite frame side elements of a vehicle; and
   a plastic body made of a plastic material overmolded on said metal structure, said overmolded plastic body defining a plurality of plastic functional elements on different regions of said metal tubular body;
   a plurality of projecting metal fastening stems fixed to said metal tubular body and distributed therealong, said projecting metal fastening stems comprises at least one outer portion provided with an outer screw threading; and at least one of said plastic functional elements of the overmolded plastic body embeds at least one of said projecting metal fastening stems with the plastic material in contact with the outer screw threading thereof.

2. The structure according to claim 1, characterized in that said projecting metal fastening stem is fixed substantially perpendicular to the longitudinal direction of the metal tubular body.

3. The structure according to claim 1, characterized in that the projecting metal fastening stem is fixed to the metal tubular body by welding or adhering.

4. The structure according to claim 3, characterized in that said attachment by welding, adhering or screwing provides a predetermined attachment force, and the projecting metal fastening stem has a distal end provided with a grip configuration that can be reached through an opening formed in the plastic material, wherein said grip configuration is suitable for being gripped by means of a rotary tool with which a predetermined torque that is capable of overcoming said predetermined attachment force is applied to the projecting metal fastening stem.

5. The structure according to claim 4, characterized in that all the projecting metal fastening stems are arranged with their longitudinal axes substantially parallel to a demolding direction of the plastic material.

6. The structure according to claim 4, characterized in that a first group of the projecting metal fastening stems are arranged with their longitudinal axes substantially parallel to a demolding direction and a second group of the projecting metal fastening stems are arranged with their longitudinal axes substantially perpendicular to said demolding direction.

7. The structure according to claim 1, characterized in that the projecting metal fastening stem is fixed to the metal tubular body by screwing said outer screw threading in a corresponding hole formed in the metal tubular body.

8. The structure according to claim 7, characterized in that said attachment by welding, adhering or screwing provides a predetermined attachment force, and the projecting metal fastening stem has a distal end provided with a grip configuration that can be reached through an opening formed in the plastic material, wherein said grip configuration is suitable for being gripped by means of a rotary tool with which a predetermined torque that is capable of overcoming said predetermined attachment force is applied to the projecting metal fastening stem.

9. The structure according to claim 8, characterized in that all the projecting metal fastening stems are arranged with their longitudinal axes substantially parallel to a demolding direction of the plastic material.

10. The structure according to claim 8, characterized in that a first group of the projecting metal fastening stems are arranged with their longitudinal axes substantially parallel to a demolding direction and a second group of the projecting metal fastening stems are arranged with their longitudinal axes substantially perpendicular to said demolding direction.

11. The structure according to claim 1, characterized in that the projecting metal fastening stem is passed through two aligned holes formed in opposite areas of the metal tubular body and fixed thereto by welding or adhering, or by screwing in at least one of said holes, the projecting metal fastening stem having two opposite projecting end regions providing two respective fastening configurations in said opposite areas of the metal tubular body.

12. The structure according to claim 11, characterized in that said attachment by welding, adhering or screwing provides a predetermined attachment force, and the projecting metal fastening stem has a distal end provided with a grip configuration that can be reached through an opening formed in the plastic material, wherein said grip configuration is suitable for being gripped by means of a rotary tool with which a predetermined torque that is capable of overcoming said predetermined attachment force is applied to the projecting metal fastening stem.

13. The structure according to claim 12, characterized in that all the projecting metal fastening stems are arranged with their longitudinal axes substantially parallel to a demolding direction of the plastic material.

14. The structure according to claim 12, characterized in that a first group of the projecting metal fastening stems are arranged with their longitudinal axes substantially parallel to a demolding direction and a second group of the projecting metal fastening stems are arranged with their longitudinal axes substantially perpendicular to said demolding direction.

15. The structure according to claim 1, characterized in that all the projecting metal fastening stems are arranged with their longitudinal axes substantially parallel to a demolding direction of the plastic material.

16. The structure according to claim 1, characterized in that a first group of the projecting metal fastening stems are arranged with their longitudinal axes substantially parallel to a demolding direction and a second group of the projecting metal fastening stems are arranged with their longitudinal axes substantially perpendicular to said demolding direction.

17. The structure according to claim 1, characterized in that at least one metal tubular reinforcing body is attached parallel to the metal tubular body in a region thereof and at least one of the plastic functional elements is overmolded partially on said metal tubular reinforcing body.

18. The structure according to claim 1, characterized in that said overmolded plastic body defines one or more overmolded plastic chords in contact with the metal tubular body and connected to the plastic functional elements.

19. The structure according to claim 1, characterized in that said plurality of overmolded plastic functional elements includes at least one steering column support in a first side region of the metal tubular body and at least one support leg in a central region of the metal tubular body.

20. The structure according to claim 19, characterized in that a metal reinforcing element is attached to the metal tubular body and/or to the metal tubular reinforcing body in said first side region of the tubular body, and said steering column support is overmolded, embedding at least partially said metal reinforcing element.

21. The structure according to claim 1, wherein the metal tubular body has surface formations selected from the group consisting of recesses, projections and a combination of recesses and projections, said overmolded plastic body embedding said surface formations.

22. A metal-plastic hybrid support structure applicable to a dashboard support of a vehicle, comprising:

a metal structure comprising a metal tubular body having a closed cross section profile and suitable length to be assembled between two opposite frame side elements of a vehicle; and a plastic body overmolded on said metal structure, said overmolded plastic body defining a plurality of plastic functional elements on different regions of said metal tubular body, said plurality of overmolded plastic functional elements including at least one steering column support in a first side region of the metal tubular body and at least one support leg in a central region of the metal tubular body;

a plurality of projecting metal fastening stems fixed to said metal tubular body and distributed therealong, at least one of said plastic functional elements of the overmolded plastic body embeds at least one of said projecting metal fastening stems; and a metal reinforcing element attached to the metal tubular body and/or to the metal tubular reinforcing body in the first side region of the metal tubular body, said steering column support being overmolded, embedding at least partially said metal reinforcing element, the metal reinforcing element having at least one hole in a region thereof in contact with the metal tubular body, one of the projecting metal fastening stems fixed to the metal tubular body is passed through said hole, and at least one portion of the plastic body is overmolded at least partially on said metal reinforcing element, embedding the projecting metal fastening stem and the hole through which the projecting metal fastening stem is inserted.

23. A metal-plastic hybrid support structure applicable to a dashboard support of a vehicle, comprising:

a metal structure comprising an elongated metal tubular body having a closed cross section profile and suitable length to be assembled between two opposite frame side elements of a vehicle; and a plastic body made of plastic material overmolded by injection on said metal structure, said overmolded plastic body defining a plurality of plastic functional elements on different regions of said metal tubular body and one or more overmolded plastic chords in contact with the metal tubular body and connecting the plastic functional elements;

a plurality of projecting metal fastening stems are fixed to said metal tubular body and distributed therealong, said projecting metal fastening stems comprising at lest one outer portion provided with an outer screw threading; and at least one of said plastic functional elements of the overmolded plastic body embeds at least one of said projecting metal fastening stems with the plastic material in contact with the outer screw threading thereof.

24. The structure according to claim 23, wherein the metal tubular body has surface formations selected from the group consisting of recesses, projections and a combination of recesses and projections, said overmolded plastic body embedding said surface formations.

* * * * *